(12) United States Patent
Gupta et al.

(10) Patent No.: US 11,086,645 B1
(45) Date of Patent: *Aug. 10, 2021

(54) PROFICIENCY BASED TUTORIAL MODIFICATION

(71) Applicant: Adobe Inc., San Jose, CA (US)

(72) Inventors: Subham Gupta, Roorkee (IN); Somya Jain, Ghaziabad (IN)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/023,764

(22) Filed: Sep. 17, 2020

Related U.S. Application Data

(63) Continuation of application No. 16/813,441, filed on Mar. 9, 2020, now Pat. No. 10,831,516.

(51) Int. Cl.
*H04N 5/93* (2006.01)
*G11B 27/00* (2006.01)
*H04N 9/73* (2006.01)
*G06F 9/451* (2018.01)
*H04N 9/64* (2006.01)
*H04N 5/232* (2006.01)

(52) U.S. Cl.
CPC ......... *G06F 9/453* (2018.02); *H04N 5/23222* (2013.01); *H04N 9/646* (2013.01); *H04N 9/73* (2013.01)

(58) Field of Classification Search
USPC ................................ 386/278, 280, 283, 239
See application file for complete search history.

(56) References Cited

U.S. PATENT DOCUMENTS

| | | | |
|---|---|---|---|
| 5,442,759 A | 8/1995 | Chiang et al. | |
| 5,493,658 A | 2/1996 | Chiang et al. | |
| 5,535,422 A | 7/1996 | Chiang et al. | |
| 6,343,237 B1 | 1/2002 | Rossow et al. | |
| 7,251,781 B2 | 7/2007 | Batchilo et al. | |
| 7,415,714 B2 | 8/2008 | Chapman | |
| 9,449,524 B2 | 9/2016 | Bruce et al. | |
| 9,649,556 B1 | 5/2017 | Curtis et al. | |
| 9,704,231 B1* | 7/2017 | Kulewski | G06T 5/50 |
| 10,002,199 B2 | 6/2018 | Soto Matamala et al. | |

(Continued)

OTHER PUBLICATIONS

"Combined Search and Examination Report", GB Application No. 1817945.7, dated Apr. 5, 2019, 7 pages.

(Continued)

*Primary Examiner* — Daquan Zhao
(74) *Attorney, Agent, or Firm* — FIG. 1 Patents

(57) ABSTRACT

In implementations of proficiency based tutorial modification, a computing device implements a tutorial system to receive a user modification of a digital image. A difference between the user modification and an application modification of the digital image is determined. The tutorial system generates a proficiency score for an editing tool based on the difference between the user modification and the application modification, and the proficiency score indicates the user's proficiency in using the editing tool. The tutorial system generates a pre-modified input image for a tutorial depicting a modification applied to an input image to be modified in the tutorial using the editing tool based on the proficiency score for the editing tool being greater than a proficiency threshold.

20 Claims, 7 Drawing Sheets

(56) References Cited

U.S. PATENT DOCUMENTS

| | | | |
|---|---|---|---|
| 10,261,672 | B1 | 4/2019 | Dolbakian et al. |
| 10,628,185 | B1* | 4/2020 | Gupta .................. G06F 3/0481 |
| 10,769,738 | B2 | 9/2020 | Chang et al. |
| 10,831,516 | B1 | 11/2020 | Gupta et al. |
| 2002/0091993 | A1 | 7/2002 | Walley et al. |
| 2004/0086834 | A1* | 5/2004 | Hamed .............. G09B 19/0053 434/118 |
| 2006/0259613 | A1 | 11/2006 | Othmer |
| 2007/0015118 | A1* | 1/2007 | Nickell .................... G09B 5/02 434/118 |
| 2013/0100159 | A1* | 4/2013 | Fernquist ................ G06T 11/20 345/619 |
| 2014/0310596 | A1* | 10/2014 | Lafreniere ............ G06F 3/0481 715/708 |
| 2014/0356837 | A1* | 12/2014 | Kutty ..................... G09B 19/00 434/322 |
| 2015/0121217 | A1* | 4/2015 | O'Donoghue ..... G06Q 30/0185 715/708 |
| 2017/0010903 | A1* | 1/2017 | Kidron ................. G11B 27/031 |
| 2017/0011645 | A1 | 1/2017 | Bruce et al. |
| 2018/0189077 | A1 | 7/2018 | Gupta et al. |
| 2018/0204097 | A1* | 7/2018 | Karki ................. G06K 9/00281 |
| 2018/0260718 | A1 | 9/2018 | Biswas et al. |
| 2018/0336044 | A1 | 11/2018 | Want et al. |
| 2019/0096280 | A1 | 3/2019 | Saunders et al. |
| 2019/0287197 | A1* | 9/2019 | Chang ..................... G09B 5/06 |

OTHER PUBLICATIONS

"Corrected Notice of Allowability", U.S. Appl. No. 15/456,212, dated Sep. 9, 2020, 2 pages.

"Corrected Notice of Allowability", U.S. Appl. No. 15/456,212, dated Sep. 17, 2020, 2 pages.

"Corrected Notice of Allowability", U.S. Appl. No. 15/456,212, dated Nov. 9, 2020, 2 pages.

"Corrected Notice of Allowability", U.S. Appl. No. 15/456,212, dated Dec. 9, 2020, 2 pages.

"Corrected Notice of Allowance", U.S. Appl. No. 15/456,212, dated Aug. 19, 2020, 13 pages.

"First Action Interview Office Action", U.S. Appl. No. 15/925,259, dated Mar. 10, 2020, 3 pages.

"First Action Interview Office Action", U.S. Appl. No. 15/456,212, dated Mar. 2, 2020, 5 pages.

"Foreign Office Action", GB Application No. 1817945.7, dated Apr. 9, 2020, 7 pages.

"Foreign Office Action", GB Application 1817945.7, dated Jul. 28, 2020, 7 pages.

"Notice of Allowance", U.S. Appl. No. 16/813,441, dated Jul. 1, 2020, 14 pages.

"Notice of Allowance", U.S. Appl. No. 15/456,212, dated Aug. 10, 2020, 16 pages.

"Notice of Allowance", U.S. Appl. No. 15/925,259, dated May 29, 2020, 7 pages.

"Pre-Interview First Office Action", U.S. Appl. No. 15/925,259, dated Jul. 1, 2019, 4 pages.

"Pre-Interview First Office Action", U.S. Appl. No. 15/456,212, dated Dec. 30, 2019, 6 pages.

Blei, David M. et al., "Latent dirichlet allocation", Journal of Machine Learning Research, Jan. 2003, 30 pages.

Davison, Brian D. et al., "Predicting Sequences of User Actions", Notes of the AAAI/ICML 1998 Workshop on Predicting the Future: AI Approaches to Time-Series Analysis, Nov. 1998, 8 pages.

Guthrie, David et al., "A Closer Look at Skip-gram Modelling", Proceedings of the 5th International Conference on Language Resources and Evaluation, Aug. 2006, 4 pages.

Hartmann, Melanie et al., "Prediction Algorithms for User Actions", Conference: LWA 2007, Jan. 2007, 6 pages.

Huang, Eric H. et al., "Improving Word Representations via Global Context and Multiple Word Prototypes", Jul. 2012, 10 pages.

Kang, Guosheng et al., "AWSR: Active Web Service Recommendation Based on Usage History", Jun. 2012, pp. 186-193.

Lee, Juhnyoung et al., "Visualization and Analysis of Clickstream Data of Online Stores for Understanding Web Merchandising", Jan. 2001, 26 pages.

Masthoff, Judith, "Group recommender systems: Combining individual models", Recommender systems handbook. Springer US, 2011, Oct. 5, 2010, 25 pages.

Mikolov, Tomas et al., "Distributed Representations of Words and Phrases and their Compositionality", Advances in neural information processing systems., Oct. 2013, 9 pages.

Mikolov, Tomas et al., "Efficient estimation of word representations in vector space", arXiv preprint arXiv:1301.3781 (2013), Sep. 7, 2013, 12 pages.

Montgomery, Alan L. et al., "Modeling online browsing and path analysis using clickstream data", Marketing Science 23.4, Feb. 24, 2004, 36 pages.

Movshovitz-Attias, Dana, "Natural Language Models for Predicting Programming Comments", Aug. 2013, 6 pages.

Murphy-Hill, Emerson et al., "Improving Software Developers' Fluency by Recommending Development Environment Commands", Nov. 2012, 11 pages.

Schultz, J M. et al., "Topic Detection and Tracking using idf-Weighted Cosine Coefficient", Proceedings of the DARPA broadcast news workshop. San Francisco: Morgan Kaufmann, Aug. 2000, 4 pages.

Siersdorfer, Stefan et al., "Social recommender systems for web 2.0 folksonomies", Proceedings of the 20th ACM conference on Hypertext and hypermedia. ACM, 2009, Jul. 1, 2009, 9 pages.

Wang, Chong et al., "Collaborative Topic Modeling for Recommending Scientific Articles", Proceedings of the 17th ACM SIGKDD International Conference of Knowledge Discovery and Data Mining ACM, Aug. 2011, 9 pages.

Zhong, Yang et al., "Time-Aware Service Recommendation for Mashup Creation in an Evolving Service Ecosystem", Jun. 2014, 8 pages.

* cited by examiner

302
Generate a proficiency map for a user based on the user's use of editing tools of an application to edit a digital image, the editing tools described in corresponding tutorial steps of a tutorial, the proficiency map including proficiency scores for the editing tools that are calculated by comparing edits to the digital image by the user using the editing tools with edits to the digital image by an algorithm of the application using the editing tools, the proficiency scores indicating the user's proficiency using the editing tools

304
Arrange the tutorial steps of the tutorial in a modified relative order based on an ascending order of the proficiency scores of the proficiency map for the editing tools described in the corresponding tutorial steps

306
Generate a modified tutorial having the tutorial steps in the modified relative order, the modified tutorial generated for display in a user interface

*Fig. 3*

PROFICIENCY BASED TUTORIAL MODIFICATION

RELATED APPLICATIONS

This application is a continuation of and claims priority to U.S. patent application Ser. No. 16/813,441, filed Mar. 9, 2020, entitled "Proficiency Based Tutorial Modification," the entire disclosure of which is hereby incorporated by reference herein in its entirety.

BACKGROUND

Applications for creating and/or editing digital content often include large sets of editing tools which can be used to adjust features of the digital content. For example, an application for editing digital photographs may include editing tools usable to adjust visual features of the digital photographs such as an exposure, a contrast, a color temperature, etc. Since many of these editing tools are complicated to use, applications frequently include tutorials which describe how to use the tools to adjust the features of the digital content. Thus, it is common for users of the applications to view these in-application tutorials or other tutorials to learn to become proficient using various digital content editing tools.

Conventional systems commonly generate tutorials as including information that is already known to many potential viewers of the tutorials. As a result, tutorials generated using conventional techniques typically include some tutorial steps which are informative to a particular user as well as other tutorial steps describing editing tools which the particular user has already mastered. Displaying these other tutorial steps to the particular user is an inefficient use of computational and/or network resources as well as a source of frustration to the particular user.

SUMMARY

Systems and techniques are described for proficiency based tutorial modification. In an example, a computing device implements a tutorial system to receive a user modification of a digital image. This user modification corresponds to a user's use of an editing tool of editing tools of an application to edit the digital image. The editing tools of the application correspond to tutorial steps of a tutorial. For example, the tutorial may be for editing an input image using the editing tools corresponding to the tutorial steps. The tutorial system determines a proficiency score for the editing tool used to edit the digital image. This proficiency score indicates the user's proficiency in using the editing tool, and the tutorial system can determine proficiency scores in several ways.

In one example, the tutorial system determines a difference between the user modification and an application modification of the digital image which corresponds to use of an algorithm of the application to edit the digital image. The tutorial system may calculate the proficiency score for the editing tool based on the difference between the user modification and the application modification. This proficiency score is then compared to a proficiency threshold. In one example, the tutorial system determines that the proficiency score for the editing tool is greater than the proficiency threshold which indicates that the user is proficient in using the editing tool.

Based on this determination, the tutorial system generates a modified tutorial by removing a tutorial step corresponding to the editing tool from the tutorial steps of the tutorial. In this way, the modified tutorial does not include the tutorial step describing how to use the editing tool that the user is already proficient using. In one example, the tutorial system generates a pre-modified input image for the tutorial. In this example, the pre-modified input image depicts a modification applied to the input image using the editing tool. Thus, pre-modified input image can be further modified using editing tools corresponding to tutorial steps of the modified tutorial.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which a proficiency map is generated that includes proficiency scores for a user's use of editing tools described in corresponding tutorial steps of a tutorial and a modified tutorial is generated having tutorial steps in a modified relative order based on an ascending order of the proficiency scores for the editing tools.

DETAILED DESCRIPTION

Overview

Figure 1:
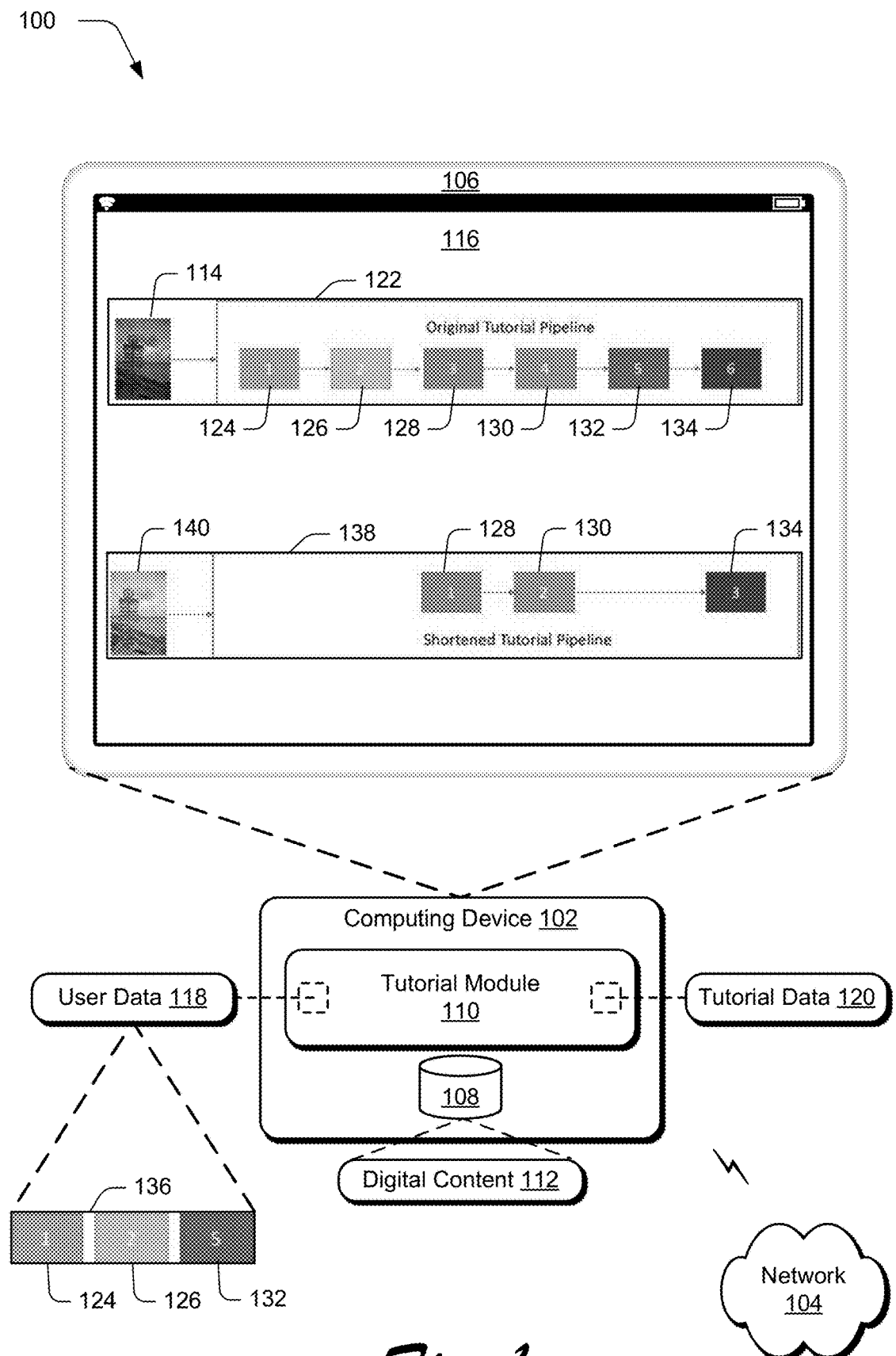
FIG. 1 is an illustration of an environment in an example implementation that is operable to employ digital systems and techniques as described herein.

Tutorials generated and displayed using conventional systems include tutorial steps describing how to use editing tools of applications for creating and/or editing digital content. These tutorials describe the editing tools at levels of detail which can be understood by the most novice of users viewing the tutorials. This is because conventional systems have no information about the users viewing the tutorials. As such, tutorials generated using conventional techniques frequently include tutorial steps describing use of a multitude of editing tools which are already well understood by many of the users that are viewing the tutorials to learn how to use a specific editing tool. Since conventional tutorials are invariable in nature, these users may be forced to view several uninformative tutorial steps in order to view the tutorial step describing the specific editing tool. Displaying uninformative tutorial steps in this way is an inefficient use of computational resources and also frustrating to users.

Systems and techniques are described for proficiency based tutorial modification. In one example, a computing device implements a tutorial system to receive input data which includes a user modification of a digital image. The user modification corresponds to a user's use of an editing tool of editing tools of an application to edit the digital image. These editing tools are associated with tutorial steps of a tutorial that describe how to use the editing tools to create and/or edit an input image.

The tutorial system processes the input data to identify the editing tools used by the user and then generates a proficiency score for each of the identified editing tools. These proficiency scores indicate the user's proficiency in using the identified editing tools as part of creating and/or editing digital images. In an example, the tutorial system determines a difference between the user modification and an application modification of the digital image. The application modification corresponds to use of an algorithm of the application to edit the digital image. In this example, the tutorial system may compute a proficiency score for the editing tool based on the difference between the user modification and the application modification. This proficiency score is then compared to a proficiency threshold. For example, the tutorial system determines that the proficiency score for the editing tool is greater than the proficiency threshold which indicates that the user is proficient in using the editing tool.

Based on this determination, the tutorial system generates a modified tutorial by removing a tutorial step corresponding to the editing tool from the tutorial steps of the tutorial. Accordingly, the modified tutorial does not include the tutorial step describing how to use the editing tool that the user is already proficient using. In an example, the tutorial system generates a pre-modified input image for the tutorial. In this example, the pre-modified input image depicts a modification applied to the input image using the editing tool. In this way, pre-modified input image may be further modified using editing tools corresponding to tutorial steps of the modified tutorial.

The tutorial system can also leverage the proficiency scores in other ways such as to reorder tutorial steps in the modified tutorial. In one example, the tutorial system may arrange tutorial steps of the modified tutorial in ascending order of proficiency scores for editing tools described by the tutorial steps. In this example, a tutorial step associated with an editing tool having a lowest proficiency score is presented first and a tutorial step associated with an editing tool having a highest proficiency score is presented last. In this way, the user viewing the modified tutorial learns how to use editing tools described by the tutorial steps starting with editing tools for which the user is least proficient which can increase user engagement as the user is learning something new. This functionality can be alternative or in addition to removing tutorial steps from the modified tutorial which describe editing tools that the user is already proficient using.

The tutorial system can also calculate chapter proficiency scores for tutorials organized into chapters such that each chapter includes multiple tutorial steps. In an example, the system calculates the chapter proficiency scores as an average score of the proficiency scores of the tutorial steps included in the chapters. In this manner, the tutorial system can order chapters in ascending order of chapter proficiency scores associated with the chapters. This can further improve user engagement and retention as the user learns chapters of the modified tutorial starting with the chapters having tutorial steps describing editing tools for which the user is least proficient.

The described systems and techniques improve conventional tutorial generation technology that generates tutorials which describe how to use editing tools without having any information about the proficiency of users in using the editing tools. By generating modified tutorials without tutorial steps describing editing tools for which a user is already proficient using, the described systems conserve computational resources used to display uninformative tutorial steps. The described systems and techniques also improve computer-based tutorial generation technology by modifying tutorials to customize an order of presentation of tutorial steps based on proficiency of the user in using editing tools described by the tutorial steps. In this way, the user can learn to use the least familiar editing tools first which increases user engagement and retention.

Term Descriptions

As used herein, the term "editing tool" refers to an element of an application for creating and/or editing digital content usable to implement editing functionality for the digital content. By way of example, a user can use an editing tool to apply a user modification to the digital content. By way of further example, a user can use a white balance editing tool to apply a white balance modification to the digital content.

As used herein, the term "algorithm" refers to an element of an application for creating and/or editing digital content usable to implement functionality of at least one editing tool to edit digital content according to a defined protocol. The defined protocol may be learned using machine learning, where a machine learning model is trained using training images to adjust values of images to produce visually pleasing images. By way of example, an application for creating and/or editing digital content can use an algorithm to apply a modification to the digital content which may be in response to a user input. By way of further example, an application for creating and/or editing digital content can use a white balance algorithm to apply a white balance modification to the digital content which can be in response to a user input.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a tutorial module 110. The storage device 108 is illustrated to include digital content 112. An example of the digital content 112 is a digital image 114 which is displayed in a user interface 116 of the display device 106.

The tutorial module 110 is illustrated as having, receiving, and/or transmitting user data 118 and tutorial data 120. The tutorial data 120 describes various tutorials which can be rendered to describe features and tools of applications for creating and/or editing the digital content 112. For example, the computing device 102 can implement the tutorial module 110 to process the tutorial data 120 to generate a tutorial 122. As illustrated, a representation of the tutorial 122 is rendered in the user interface 116 of the display device 106.

In this example, the tutorial 122 includes tutorial steps 124-134 which correspond to instructions for using editing tools to edit the digital image 114, e.g., using an application for creating and/or editing the digital content 112. By way of example, tutorial step 124 may describe use of an exposure editing tool which can be used to adjust an overall brightness depicted in the digital image 114. In another example, tutorial step 124 can describe use of a contrast editing tool which can be used to increase or decrease a contrast depicted in the digital image 114. Thus, tutorial steps 124-134 can each describe use of any tool for editing and/or creating the digital image 114.

The user data 118 describes a user's use of editing tools as part of creating and/or editing the digital content 112. For example, the user data 118 can include digital images which the user has created and/or edited using editing tools of an application for creating and/or editing the digital content 112. The user data 118 is illustrated to include a representation 136 of tutorial steps of the tutorial 122 which describe use of editing tools for which the user is already proficient. For example, the computing device 102 implements the tutorial module 110 to process the user data 118 to determine particular editing tools which the user has used to edit the digital content 112.

After determining the particular editing tools which the user has used, the tutorial module 110 further processes the user data 118 to determine whether the user's use of the particular editing tools indicates that the user is proficient in using the particular editing tools. To do so, the tutorial module 110 generates a proficiency score for each of the particular editing tools. The tutorial module 110 can generate these proficiency scores in several ways. In one example, the tutorial module 110 generates a proficiency score for a particular editing tool based on a number of times the user has used the particular editing tool to create and/or edit the digital content 112. In this example, the tutorial module 110 compares the number of times that the user has used the particular editing tool to a use threshold as part of computing a proficiency score for the particular editing tool. In one example, the tutorial module 110 can compute a proficiency score based on a determination that a number of uses of the particular editing tool is greater than a use threshold.

In another example, the tutorial module 110 generates a proficiency score for the particular editing tool based on a number of times the user has used the particular editing tool as well as a number of times that the user has correctly used the particular editing tool. In this example, the tutorial module 110 can determine whether a use of the particular editing tool is a correct use of the particular editing tool by comparing features of the user's use of the editing tool to features of a known correct use of the particular editing tool. For example, a user value applied to the digital content 112 by the user using the particular editing tool may be compared to an application value computed using an algorithm of the application for creating and/or editing the digital content 112 to approximate a correctness of the user's use of the particular editing tool.

Consider an example in which the tutorial module 110 generates a proficiency score for a white balance editing tool by determining a user white balance modification applied by the user to a digital image of the digital content 112 using the white balance editing tool. The tutorial module 110 then determines a white balance modification applied to the digital image of the digital content 112 by a white balance algorithm of an application for creating and/or editing the digital content 112. In this example, the tutorial module 110 may calculate a difference between the user white balance modification applied by the user and the white balance modification applied by the white balance algorithm. The tutorial module 110 compares this difference to a threshold and if the difference is less than the threshold, then the tutorial module 110 determines that the user's use of the white balance editing tool is approximately correct. Alternatively, if the difference is greater than the threshold, then the tutorial module 110 determines that the user's use of the white balance editing tool is not correct.

Continuing the previous example, the tutorial module 110 compares white balance modifications applied to additional digital images by the user using the white balance editing tool with white balance modifications applied to the additional digital images by the white balance algorithm. For each instance of the user's use of the white balance editing tool, the tutorial module 110 can approximate a correctness of the user's use of the editing tool by comparing the user's applied white balance modifications to white balance modifications applied by the white balance algorithm In this way, the tutorial module 110 can determine a total number of times the user used the white balance editing tool correctly which the tutorial module 110 can leverage to generate a proficiency score for the white balance editing tool.

For example, the tutorial module may determine the user's proficiency in using the white balance editing tool based on the number of times the user correctly used the white balance editing tool. The computing device 102 implements the tutorial module 110 to generate a proficiency score for the white balance editing tool based on the number of times the user correctly used the white balance editing tool. In this example, the tutorial module 110 can compare the proficiency score for the white balance editing tool with a proficiency threshold. If the proficiency score for the white balance editing tool is greater than the proficiency threshold, then the tutorial module 110 can determine that the user is proficient in use of the white balance editing tool. Alternatively, if the proficiency score for the white balance editing tool is less than the proficiency threshold, then the tutorial module 110 may determine that the user is not proficient in use of the white balance editing tool.

Additional techniques for approximating a correctness of the user's use of an editing tool and/or generating proficiency scores for the user's use of editing tools are contemplated. Consider another example in which the tutorial module 110 generates a proficiency score for the user's use of a lighting effect editing tool by determining a lighting effect value applied to the digital image of the digital content 112 by the user using the lighting effect editing tool. The tutorial module 110 then determines a lighting effect value applied to the digital image of the digital content 112 by a machine learning model, e.g., a convolutional neural network, trained using training data to learn to correctly use the lighting effect editing tool. In this example, the tutorial module 110 calculates a difference between the lighting effect value applied to the digital image of the digital content 112 by the user and the lighting effect value applied to the digital image by the machine learning model. The tutorial module 110 then compares this calculated difference to a threshold. If the calculated difference is less than the threshold, then the tutorial module 110 determines that the user's use of the lighting effect editing tool is approximately correct. Alternatively, if the calculated difference is greater than the threshold, then the tutorial module 110 determines that the user's use of the lighting effect editing tool is not correct.

In the previous example, the tutorial module 110 can approximate a correctness of a user's user of a particular editing tool using a machine learning model, e.g., a convolutional neural network, trained to identify a correct use of the particular editing tool. In another example, the tutorial module 110 approximates a correctness of a user's use of a particular editing tool using a machine learning model trained to identify an incorrect use of the particular editing tool. In these examples, the tutorial module 110 determines that a particular editing tool has been used to edit a digital image of the digital content 112. The tutorial module 110 then uses the trained machine learning model to generate an indication of a correctness of the use of the particular editing tool, e.g., by processing the digital image of the digital content 112. In this way, the tutorial module 110 can determine a total number of times the particular editing tool is correctly used to edit digital images of the digital content 112 and the tutorial module 110 may then generate a proficiency score for a user's use of the particular editing tool based on the total number of correct uses of the particular editing tool.

In the illustrated example, representation 136 includes tutorial steps 124, 126, and 132 which correspond to a first editing tool, a second editing tool, and a third editing tool, respectively, for which the user is already proficient. The tutorial module 110 processes tutorial data 120 and the user data 118 which includes the representation 136 to generate a modified tutorial 138. A representation of the modified tutorial 138 is rendered in the user interface 116 of the display device 106.

As shown, the modified tutorial 138 includes tutorial steps 128, 130, and 134 and the modified tutorial 138 excludes tutorial steps 124, 126, and 132. Thus, the tutorial module 110 generates the modified tutorial 138 as excluding tutorial steps which correspond to editing tools that the user is determined to be proficient using. In this way, the modified tutorial 138 represents a customized version of the tutorial 122 which excludes tutorial steps that describe editing tools based on the user's proficiency with the editing tools.

The computing device 102 also implements the tutorial module 110 to generate a modified digital image 140 which is displayed in the user interface 116 of the display device 106. This modified digital image 140 is the digital image 114 with editing applied using the editing tools corresponding to the excluded tutorial steps 124, 126, and 132. Thus, the modified digital image 140 is a pre-modified digital image depicting modifications applied to the digital image 114 using the editing tools corresponding to the excluded tutorial steps 124, 126, and 132. In one example, visual features applied to the digital image 114 using editing tools described in the tutorial steps 124-134 may be order independent such that the digital image 114 modified by editing tools described by tutorial steps 124-134 will be the same as the modified digital image 140 modified by editing tools described by tutorial steps 128, 130, and 134.

Figure 2:
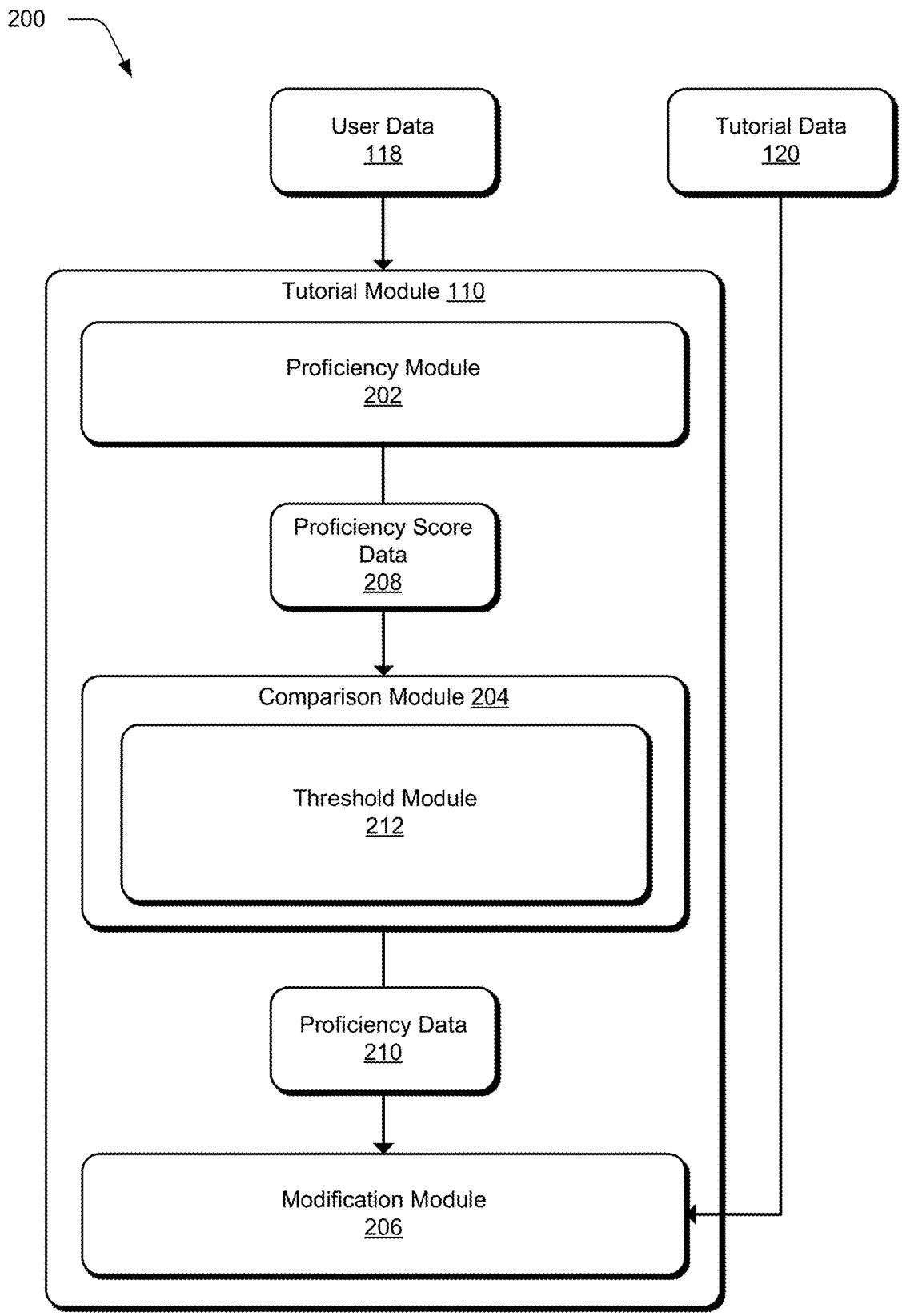
FIG. 2 depicts a system in an example implementation showing operation of a tutorial module.

FIG. 2 depicts a system 200 in an example implementation showing operation of a tutorial module 110. The tutorial module 110 is illustrated to include a proficiency module 202, a comparison module 204, and a modification module 206. The proficiency module 202 receives the user data 118 and processes the user data 118 to generate proficiency score data 208. For example, the proficiency module 202 processes the user data 118 and identifies uses of editing tools as part of creating and/or editing digital images included within the digital content 112.

The proficiency module 202 then determines a minimum number of times the identified editing tools should be used to become eligible for determining a proficiency of the user's use of the identified editing tools. This minimum number of uses may be specific to individual editing tools of the identified editing tools. For example, a relatively difficult or complicated editing tool may have a greater minimum number of uses for eligibility than a relatively easy or simple editing tool.

The proficiency module 202 processes the user data 118 and determines a number of times the user has used each of the identified editing tools. In one example, the proficiency module 202 can determine the number of uses of a particular editing tool on a per digital image basis. In this example, if the particular editing tool is used multiple times to modify a particular digital image of the digital content 112, then the proficiency module 202 considers this use as a single use of the particular editing tool. For example, if the proficiency module 202 determines that the particular editing tool was used three times to edit one particular digital image, then the proficiency module 202 determines that particular editing tool is used one time based on the one particular digital image.

In another example, the proficiency module 202 determines the number of uses of a particular editing tool on a per use basis. In this example, if the proficiency module 202 determines that the particular editing tool was used three times to edit one particular image, then the proficiency module 202 determines that the particular editing tool is used three times. In an additional example, the proficiency module 202 can determine a number of uses of the particular editing tool on a per digital image basis and on a per use basis. In this way, the proficiency module 202 can distinguish between limited use of a particular editing tool to edit multiple digital images of the digital content 112 and extensive use of the particular editing tool to edit a single digital image.

The proficiency module 202 can generate a proficiency score for each identified editing tool based on the minimum number of uses for proficiency determination eligibility and the determined number of uses of each identified editing tool. The proficiency module 202 generates the proficiency score data 208 describing the generated proficiency score for each identified editing tool. In an example, the proficiency module 202 also determines a number of correct uses for each identified editing tool. In this example, the proficiency module 202 generates a proficiency score for each identified editing tool based on the minimum number of uses for proficiency determination eligibility, the determined number of uses, and the determined number of correct uses of each identified editing tool. The proficiency module 202 then generates the proficiency score data 208 as including data describing the proficiency score generated for each identified editing tool.

The comparison module 204 receives the proficiency score data 208 and the comparison module 204 processes the proficiency score data 208 to generate proficiency data 210. For example, the comparison module 204 can include a threshold module 212 and the comparison module 204 can implement the threshold module 212 to process the proficiency score data 208 to determine the user's proficiency in using the identified editing tools. To do so, the threshold module 212 compares each proficiency score described by the proficiency score data 208 to a proficiency threshold. The comparison module 204 then generates the proficiency data 210 describing indications of results of these comparisons.

For example, each proficiency score included in the proficiency score data 208 can correspond to one of the tutorial steps 124-134. Thus, each of the identified editing tools corresponds to one of the tutorial steps 124-134 in this example. By comparing each proficiency score of the identified editing tools to a proficiency threshold associated with the identified editing tools, the threshold module 212 determines that the user is proficient using a particular editing tool if the proficiency score for the particular editing tool is greater than the proficiency threshold for the particular editing tool. If the proficiency score for the particular editing tool is less than the proficiency threshold for the particular editing tool, then the threshold module 212 determines that the user is not proficient using the particular editing tool.

The comparison module 204 generates the proficiency data 210 to include indications of the user's determined proficiency or lack of proficiency using the identified editing tools. In an example in which each identified editing tool corresponds to one of the tutorial steps 124-134, the comparison module 204 generates the proficiency data 210 as having indications that the user is proficient in using editing tools described in tutorial steps 124, 126, and 132 and as having indications that the user is not proficient in using editing tools described in tutorial steps 128, 130, and 134. The modification module 206 receives the proficiency data 210 and the tutorial data 120 and the modification module 206 processes the proficiency data 210 and the tutorial data 120 to generate a modified tutorial.

For example, the modification module 206 can process the proficiency data 210 and the tutorial data 120 to generate the modified tutorial 138 as excluding tutorial steps 124, 126, and 132 based on the indications included in the proficiency data 210 that the user is already proficient in use of editing tools described in tutorial steps 124, 126, and 132. The modification module 206 generates the modified tutorial 138 as including tutorial steps 128, 130, and 134 based on the indications included in the proficiency data 210 that the user is not proficient in using editing tools described in tutorial steps 128, 130, and 134. In the example illustrated in FIG. 1, the modification module 206 generates the modified tutorial 138 having tutorial steps 128, 130, and 134 in a same relative order as the tutorial steps 128, 130, and 134 appear in the tutorial 122.

In other examples, the modification module 206 can generate the modified tutorial 138 having the tutorial steps 128, 130, and 134 in an order based on proficiency scores which may be different from the order of the tutorial steps 128, 130, and 134 in the tutorial 122. For example, if tutorial steps 128, 130, and 134 describe use of first, second, and third editing tools, respectively, then the modification module 206 can generate the modified tutorial 138 as including the tutorial steps 128, 130, and 134 in an order based on proficiency scores for the first, second, and third editing tools.

Consider an example in which a proficiency score for the third editing tool is less than a proficiency score for the first editing tool and less than a proficiency score for the second editing tool. In this example, the proficiency score for the second editing tool is less than the proficiency score for the first editing tool. In one example, the modification module 206 generates the modified tutorial 138 having the tutorial steps 128, 130, and 134 ordered based on the corresponding proficiency scores for the first, second, and third editing tools.

In an example in which the tutorial steps 128, 130, and 134 are rearranged based on ascending order of proficiency scores, the modification module 206 orders tutorial step 134 first, tutorial step 130 second, and tutorial step 128 third. By generating the modified tutorial 138 based on the ascending order of the proficiency scores, the user learns to use the editing tools starting with the editing tools having a lowest proficiency score. This improves user engagement because the user is learning something new.

In an example in which the tutorial steps 128, 130, and 134 are rearranged based on descending order of proficiency scores, the modification module 206 orders tutorial step 128 first, tutorial step 130 second, and tutorial step 134 third. By generating the modified tutorial 138 based on the descending order of the proficiency scores, the user learns to use the editing tools starting with the editing tools having a highest proficiency score. This increases user comfort level because the user is learning something which may already be somewhat familiar to the user.

Consider an example of a tutorial which is organized by chapters and each of the chapters includes multiple tutorial steps which each describe use of a particular editing tool. In this example, the modification module 206 can determine a chapter proficiency score of a particular chapter of the tutorial as an average score of proficiency scores of tutorial steps of the particular chapter. For example, the modification module 206 can order the tutorial steps of the particular chapter based on an ascending or descending order of proficiency scores corresponding to the tutorial steps of the particular chapter. The modification module 206 can also order chapters of the tutorial based on an ascending or descending order of chapter proficiency scores of the chapters. In this way, the modification module 206 can leverage the proficiency scores to remove tutorial steps for learning use of editing tools which the user is already proficient using and also to order tutorial steps for learning use of editing tools which the user is not proficient using.

In one or more implementations, the tutorial module 110 employs Portable Tutorial Format (PTF) to further customize tutorials. Each PTF document represents one tutorial. A PTF document can include multiple chapters and each chapter may include multiple tutorial steps such that there is a one to one mapping between the tutorial steps and editing tools which are described in the tutorial steps. An optional new field is added within each tutorial step and each chapter of the PTF document named "user_attributes." This new field is generic and can include multiple personalized user attributes in one example. Examples of personalized user attributes can include user language preferences, tutorial duration minimums and/or maximums, volume settings, etc.

The proficiency data 210 is added to the PTF document in the user_attributes field. In this way, the computing device 102 implements the tutorial module 110 to access the proficiency data 210 in the user_attributes field of the PTF document and the tutorial module 110 can use the proficiency data 210 to generate a tutorial as excluding tutorial steps which describe editing tools that the user is already proficient in using. For example, the tutorial module 110 accesses the proficiency data 210 in the user_attributes field of the PTF document to exclude tutorial steps from tutorial chapters of the tutorial. If the user is proficient using editing tools described by all of the tutorial steps of a particular chapter, then the tutorial module can generate the tutorial as excluding the particular chapter.

The tutorial module 110 can also use the proficiency data 210 to generate the tutorial having tutorial steps ordered according to an ascending or descending order of proficiency scores for editing tools described in the tutorial steps. The tutorial module 110 can additionally leverage the proficiency data 210 in the user_attributes field of the PTF document to determine chapter proficiency scores as the average of the proficiency scores corresponding to tutorial steps of the chapters. In this manner, the tutorial module 110 can generate the tutorial having chapters ordered according to an ascending or descending order of the determined chapter proficiency scores.

In an example in which a user_attributes field of a particular PTF document does not include the proficiency data 210 or includes outdated proficiency data, the computing device 102 can implement the tutorial module 110 to include or update the proficiency data 210 in the user_attributes field. By including or updating the proficiency data 210 in the user_attributes field of the PTF document, the proficiency data 210 can be leveraged as previously described. For a typical user, this may amount to approximately a 30% reduction in tutorial duration. Additionally, a modified tutorial generated by leveraging the proficiency data 210 is customized for the user which increases user engagement and retention.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

FIG. 3 is a flow diagram depicting a procedure 300 in an example implementation in which a proficiency map is generated that includes proficiency scores for a user's use of editing tools described in corresponding tutorial steps of a tutorial and a modified tutorial is generated having tutorial steps in a modified relative order based on an ascending order of the proficiency scores for the editing tools. A proficiency map is generated for a user based on the user's use of editing tools of an application to edit a digital image (block 302), the editing tools described in corresponding tutorial steps of a tutorial, the proficiency map including proficiency scores for the editing tools that are calculated by comparing edits to the digital image by the user using the editing tools with edits to the digital image by an algorithm of the application using the editing tools, the proficiency scores indicating the user's proficiency using the editing tools. In one example, the computing device implements the tutorial module 110 to generate the proficiency map. The tutorial steps are arranged in a modified relative order based on an ascending order of the proficiency scores of the proficiency map for the editing tools described in the corresponding tutorial steps (block 304). For example, the tutorial module 110 can arrange the tutorial steps in the modified relative order. A modified tutorial having the tutorial steps in the modified relative order is generated (block 306), the modified tutorial generated for display in a user interface. In an example, the tutorial module 110 generates the modified tutorial.

Figure 4:
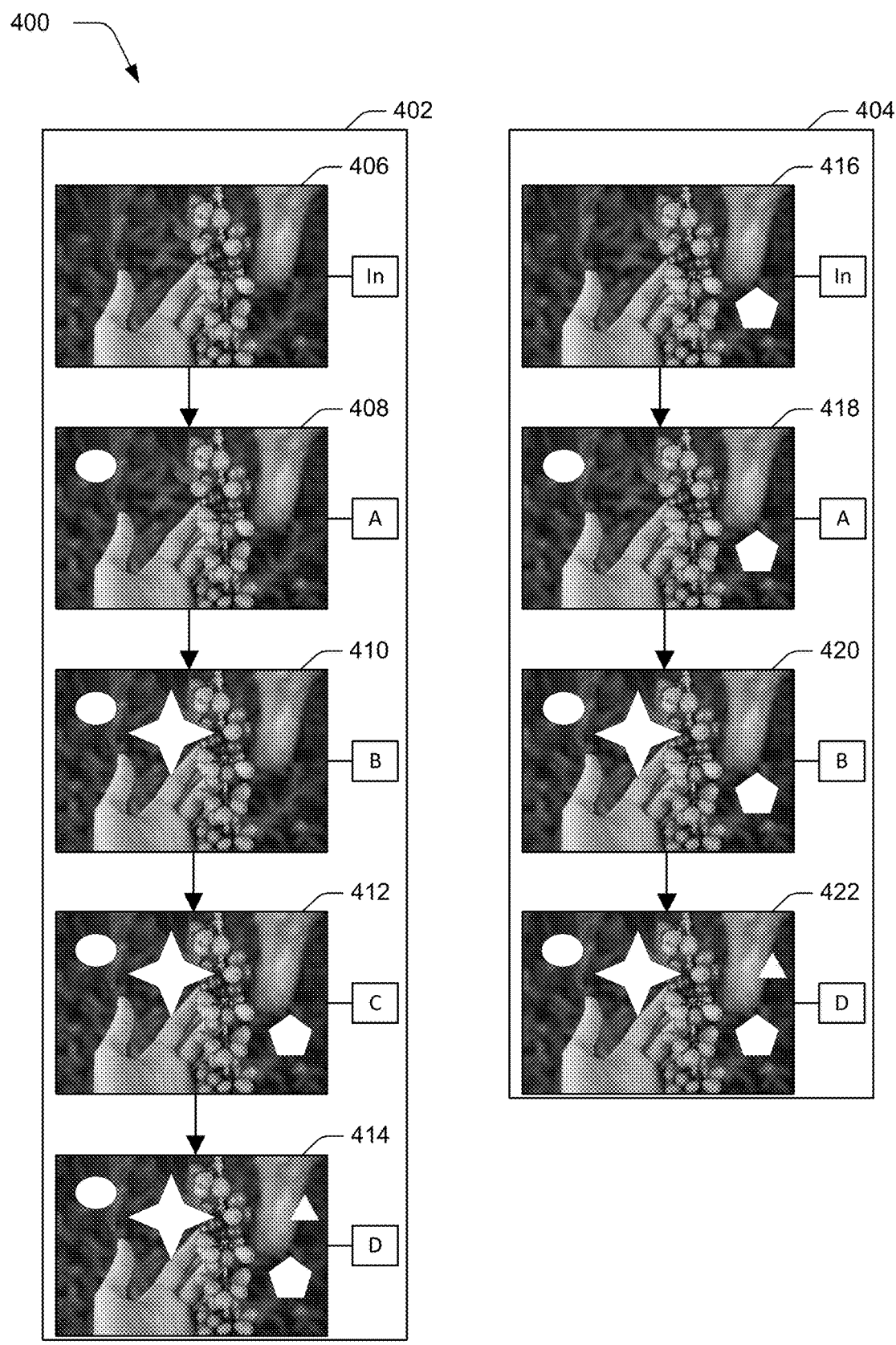
FIG. 4 is an illustration of a representation of a proficiency based tutorial modification.

FIG. 4 is an illustration of a representation 400 of a proficiency based tutorial modification. The representation 400 includes a tutorial 402 and a modified tutorial 404. The tutorial 402 begins with an input digital image 406 which will be modified by tutorial steps 408-414 of the tutorial 402. For example, the tutorial steps 408-414 each describe an editing tool and the input digital image 406 is modified by these editing tools as a user progresses through the tutorial steps 408-414 of the tutorial 402.

At tutorial step 408, the input digital image 406 is modified using editing tool A. As shown, editing tool A adds a white oval shape to the input digital image 406 at tutorial step 408. At tutorial step 410, the input digital image 406 is further modified using editing tool B. As illustrated, editing tool B adds a white star shape to the input digital image 406 at tutorial step 410. Thus, the input digital image 406 now depicts the white oval shape added using editing tool A and the white star shape added using editing tool B.

At tutorial step 412, the input digital image 406 is further modified using editing tool C. As shown in FIG. 4, editing tool C adds a white pentagon shape to the input digital image 406 at tutorial step 412. As further shown, the input digital image 406 now depicts the white oval shape added using editing tool A, the white star shape added using editing tool B, and the white pentagon shape added using editing tool C.

At tutorial step 414, the input digital image 406 is further modified using editing tool D. As illustrated, editing tool D adds a white triangle shape to the input digital image 406 at tutorial step 414. The tutorial 402 is now complete and the input digital image 406 now depicts the white oval shape added using editing tool A, the white star shape added using editing tool B, the white pentagon shape added using editing tool C, and the white triangle shape added using editing tool D.

The computing device 102 implements the tutorial module 110 to generate the modified tutorial 404. To do so, the tutorial module 110 processes the user data 118 to generate proficiency scores for editing tools A-D. In one example, the tutorial module 110 may generate proficiency scores according to the following:

$$\text{Proficiency}(T) = \begin{Bmatrix} 0, & n_T \leq m_T \\ k_T/n_T, & n_T > m_T \end{Bmatrix}$$

where: T is an editing tool; $k_T$ is an approximate number of times tool T was used correctly by the a user; $n_T$ is a total number of times tool T was used by the user; and $m_T$ is a minimum number of times tool T should be used to become eligible for proficiency calculations, ($m_T$>0).

For example, the tutorial module 110 can count a number of digital images included in the digital content 112 which have been edited and/or created using editing tool T to determine $n_T$. The tutorial module 110 can approximate a number of times the editing tool T was used correctly by calculating distances or differences between user applied values to the digital images and application values applied to the digital images. If a particular calculated distance or difference between a particular user applied value and a particular application value applied to a particular digital image is less than a threshold, then the tutorial module 110 determines that the user's use of editing tool T on the particular digital image was approximately correct. Alternatively, if the particular calculated distance is greater than the threshold, then the tutorial module 110 determines that the user's use of editing tool T on the particular digital image was not correct.

In example in which an algorithm for editing tool T is not available, the tutorial module 110 may generate proficiency scores according to the following:

$$\text{Proficiency}(T) = \frac{1}{1 + e^{-n_T + m_T}}$$

where: T is an editing tool; $n_T$ is a total number of times tool T was used by the user; and $m_T$ is a minimum number of times tool T should be used to become eligible for proficiency calculations, ($m_T$>0). For example, $m_T$ may be a use threshold.

In the above examples, each generated proficiency score is compared to a proficiency threshold to determine the user's proficiency using editing tools corresponding to the tutorial steps 408-414 of the tutorial 402. This proficiency threshold may be independent of a particular editing tool or the proficiency threshold may depend on the particular editing tool being evaluated for proficiency. For example, a difficult editing tool may have a greater threshold for proficiency than a simple editing tool.

Consider an example in which the tutorial module 110 compares differences between user modifications applied to a particular digital image using editing tools A-D and application modifications applied to the particular digital image by algorithm of an application for editing digital images using editing tools A-D. In this example, the tutorial module 110 determines a user modification applied to the particular digital image by a user using editing tool A. The tutorial module 110 also determines an application modification applied to the particular digital image by the application for editing digital images using editing tool A. Continuing this example, the tutorial module 110 determines a difference between the user modification and the application modification. For example, the tutorial model 110 may calculate a proficiency score for the user's use of editing tool A based on this difference. In one example, the tutorial module 110 can compare the difference to a difference threshold as part of calculating the proficiency score such as to determine that the difference between the user modification and the application modification is less than the difference threshold. For example, the tutorial module 110 may generate proficiency scores for editing tools B-D in this manner as well.

In one example, the computing device 102 implements the tutorial module 110 to update a proficiency map to include proficiency scores for editing tools A-D. For example, the proficiency map maps a user's proficiency scores for editing tools to an application for editing digital images. As the tutorial module 110 computes proficiency scores for editing tools, the tutorial module 110 may update the proficiency map to include proficiency scores for new editing tools or updated proficiency scores for existing editing tools.

After generating the proficiency scores for editing tools A-D, the tutorial module 110 compares the proficiency scores to a proficiency threshold. In the illustrated example, the proficiency score for editing tool C is greater than the proficiency threshold and the proficiency scores for editing tools A, B, and D are below the proficiency threshold. Thus, the tutorial module 110 determines that the user is proficient in using editing tool C and that the user is not proficient in using editing tools A, B, and D. The tutorial module 110 generates the modified tutorial 404 as excluding a tutorial step corresponding to editing tool C.

The tutorial module 110 also generates a modified input digital image 416 which is the input digital image 406 modified using editing tool C. For example, the modified input digital image 416 is a pre-modified digital image depicting modifications applied to the input digital image 406 using editing tool C based on the proficiency score for editing tool C being greater than the proficiency threshold. As shown, the modified input digital image 416 depicts the white pentagon shape corresponding to editing tool C. The modified tutorial 404 is illustrated to include tutorial steps 418-422 in which the modified input digital image 416 will be further modified by editing tools described in the tutorial steps 418-422.

At tutorial step 418, the modified input digital image 416 is modified using editing tool A. As shown, editing tool A adds the white oval shape to the modified input digital image 416 at tutorial step 418. The modified input digital image 416 now depicts the white pentagon shape added using editing tool C to generate the modified input digital image 416 and the white oval shape added using editing tool A.

At tutorial step 420, the modified input digital image 416 is further modified using editing tool B. As illustrated, editing tool B adds the white star shape to the modified input digital image 416 at tutorial step 420. Thus, the modified input digital image 416 now depicts the white pentagon shape added using editing tool C, the white oval shape added using editing tool A, and the white star shape added using editing tool B.

At tutorial step 422, the modified input digital image 416 is further modified using editing tool D. As illustrated, editing tool D adds the white triangle shape to the modified input digital image 416 at tutorial step 422. The modified tutorial 404 is now complete and the modified input digital image 416 depicts the white pentagon shape added using editing tool C, the white oval shape added using editing tool A, the white star shape added using editing tool B, and the white triangle shape added using editing tool D. As shown, the modified input digital image 416 at tutorial step 422 is the same as the input digital image 406 at tutorial step 414. This is because the editing tools A-D are order independent in this example.

In some examples, the tutorial module 110 may leverage the proficiency scores for editing tools A, B, and D to rearrange an order of tutorial steps 418-422. Consider an example in which the proficiency score for editing tool B is lower than the proficiency scores for editing tools A and D. In this example, the proficiency score for editing tool A is higher than the proficiency score for editing tool D. For example, the computing device 102 can implement the tutorial module 110 to order the tutorial steps 418-422 in ascending order of the proficiency scores of the editing tools described in the tutorial steps 418-422. In this example, the tutorial module 110 orders tutorial step 420 first, tutorial step 422 second, and tutorial step 418 third. In an example in which the tutorial module 110 orders the tutorial steps 418-422 in descending order of the proficiency scores of the editing tools described in the tutorial steps 418-422, the tutorial module 110 orders tutorial step 418 first, tutorial step 422 second, and tutorial step 420 third.

Consider another example in which the tutorial module 110 may leverage the proficiency scores for editing tools A, B, and D to rearrange chapters of a tutorial. For example, the modified tutorial 404 may be a chapter of another tutorial and the tutorial module 110 determines a chapter proficiency score of the chapter as an average of the proficiency scores for editing tools A, B, and D. In this way, the tutorial module 110 can leverage the chapter proficiency score of the chapter and an additional chapter proficiency score of an additional chapter to order the chapter and the additional chapter based on the chapter proficiency score and the additional chapter proficiency score. This chapter ordering can be in ascending or descending order of chapter proficiency scores.

Figure 5:
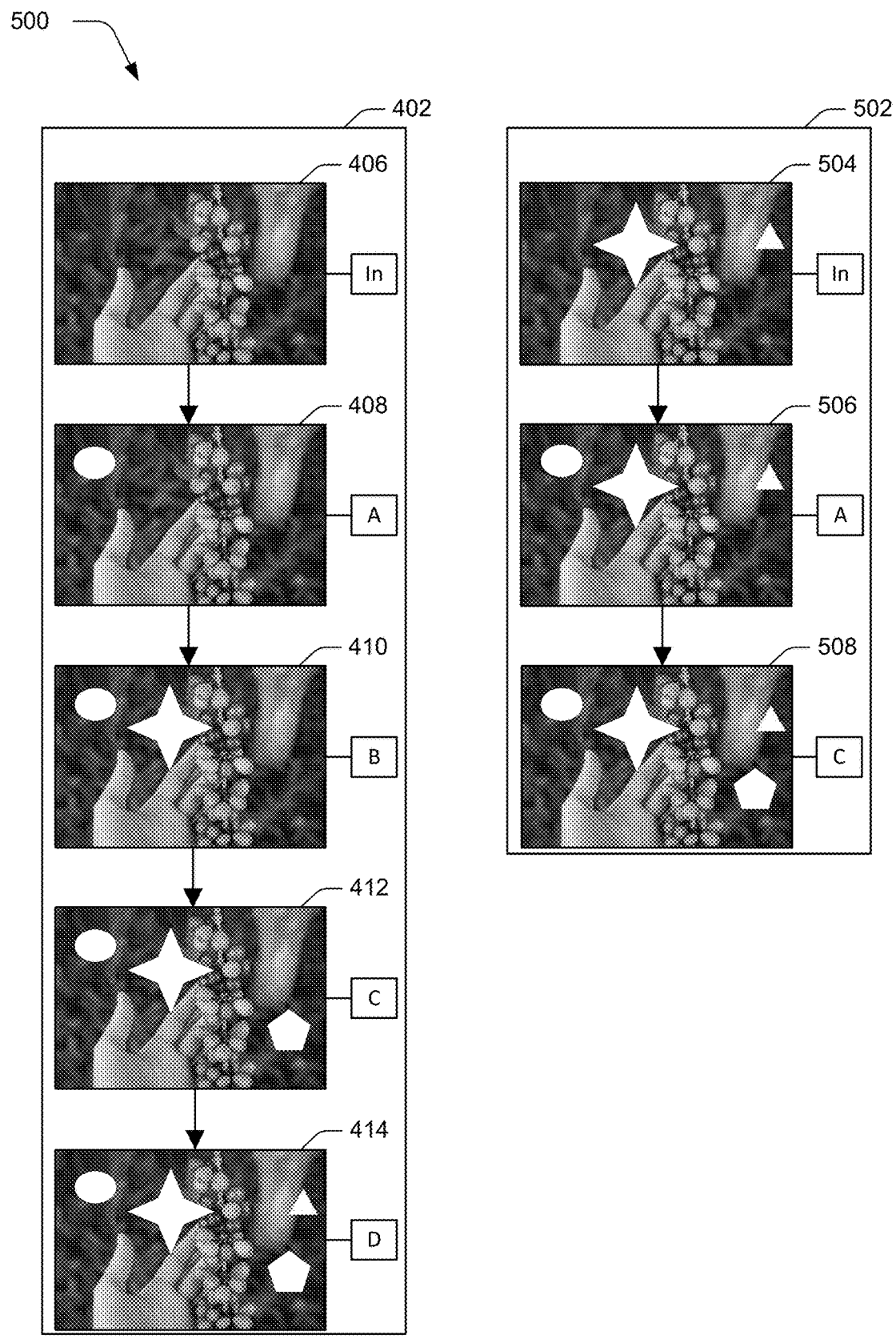
FIG. 5 is an illustration of a representation of an additional proficiency based tutorial modification.

FIG. 5 is an illustration of a representation 500 of an additional proficiency based tutorial modification. The representation 500 includes the tutorial 402 and a modified tutorial 502. In this example, the tutorial 402 begins with an input digital image 406 which will be modified by editing tools A-D at corresponding tutorial steps 408-414 of the tutorial 402. To generate the modified tutorial 502 the computing device 102 implements the tutorial module 110 which processes the user data 118 to generate proficiency scores for editing tools A-D. For example, the tutorial module 110 may update the proficiency map to include proficiency scores for editing tools A-D.

After generating the proficiency scores for editing tools A-D, the tutorial module 110 compares the proficiency scores to a proficiency threshold. In this example, the proficiency scores for editing tools B and D are greater than the proficiency threshold and the proficiency scores for editing tools A and C are below the proficiency threshold. Thus, the tutorial module 110 determines that the user is proficient in using editing tools B and D and that the user is not proficient in using editing tools A and C. The tutorial module 110 generates the modified tutorial 502 as excluding tutorial steps corresponding to editing tools B and D.

The tutorial module 110 also generates a modified input digital image 504 which is the input digital image 406 modified using editing tools B and D. As shown, the modified input digital image 504 depicts the white star shape corresponding to editing tool B. The modified input digital image 504 also depicts the white triangle shape corresponding to editing tool D. However, the modified input digital image 504 does not depict the white oval shape or the white pentagon shape corresponding to editing tools A and C, respectively. This is because the user is not proficient in using editing tools A and C.

The modified tutorial 404 is illustrated to include tutorial steps 506, 508 in which the modified input digital image 504 will be further modified by editing tools described in the tutorial steps 506, 508. At tutorial step 506, the modified input digital image 504 is modified using editing tool A. As illustrated, editing tool A adds the white oval shape to the modified input digital image 504 at tutorial step 506. The modified input digital image 504 now depicts the white star shape added using editing tool B and the white triangle shape added using editing tool D to generate the modified input digital image 504 as well as the white oval shape added using editing tool A.

At tutorial step 508, the modified input digital image 504 is further modified using editing tool C. As shown, editing tool C adds the white pentagon shape to the modified input digital image 504 at tutorial step 508. The modified tutorial 502 is now complete and the modified input digital image 504 depicts the white star shape added using editing tool B, the white triangle shape added using editing tool D, the white oval shape added using editing tool A, and the white pentagon shape added using editing tool C. As further shown, the modified input digital image 504 at tutorial step 508 is the same as the input digital image 406 at tutorial step 414 because the editing tools A-D are order independent in this example.

Figure 6:
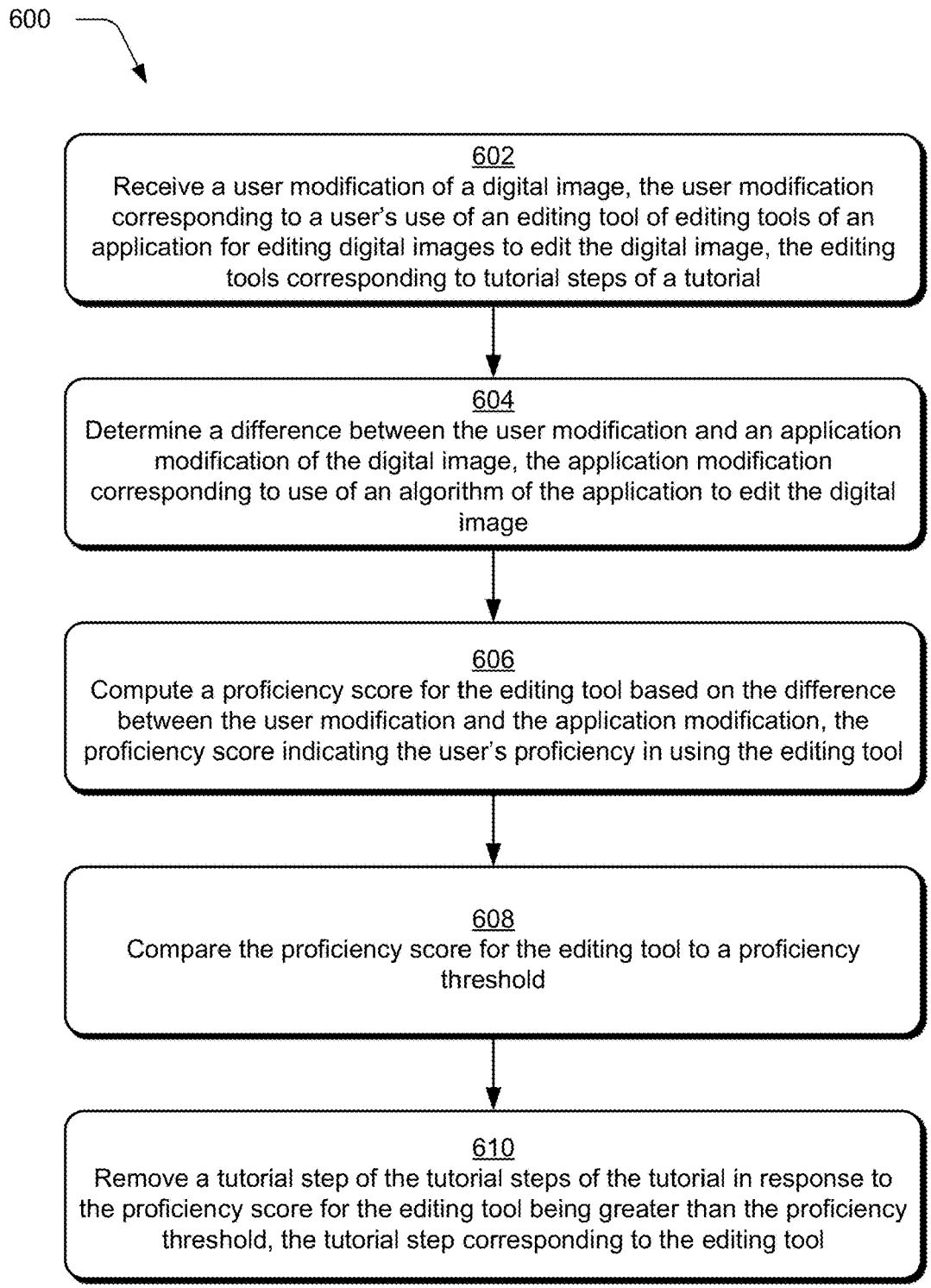
FIG. 6 is a flow diagram depicting a procedure in an example implementation in which a tutorial step of a tutorial is removed based on a proficiency score indicating a user's proficiency in using an editing tool corresponding to the tutorial step.

FIG. 6 is a flow diagram depicting a procedure 600 in an example implementation in which a tutorial step of a tutorial is removed based on a proficiency score indicating a user's proficiency in using an editing tool corresponding to the tutorial step. A user modification of a digital image is received (block 602), the user modification corresponding to a user's use of an editing tool of editing tools of an application for editing digital images to edit the digital image, the editing tools corresponding to tutorial steps of a tutorial. The computing device 102 can implement the tutorial module 110 to receive the user modification of the digital image. A difference between the user modification and an application modification of the digital image is determined (block 604), the application modification corresponding to use of an algorithm of the application to edit the digital image. For example, the tutorial module 110 determines the difference between the user modification and the application modification.

A proficiency score for the editing tool is computed based on the difference between the user modification and the application modification (block 606), the proficiency score indicating the user's proficiency in using the editing tool. In one example, the tutorial module 110 computes the proficiency score based on the difference between the user modification and the application modification. The proficiency score for the editing tool is compared to a proficiency threshold (block 608). The computing device 102 implements the tutorial module 110 to compare the proficiency score for the editing tool to the proficiency threshold in one example. A tutorial step of the tutorial steps of the tutorial is removed in response to the proficiency score for the editing tool being greater than the proficiency threshold (block 610), the tutorial step corresponding to the editing tool. For example, the tutorial module 110 removes the tutorial step of the tutorial steps of the tutorial in response to the proficiency score for the editing tool being greater than the proficiency threshold.

Example System and Device

Figure 7:
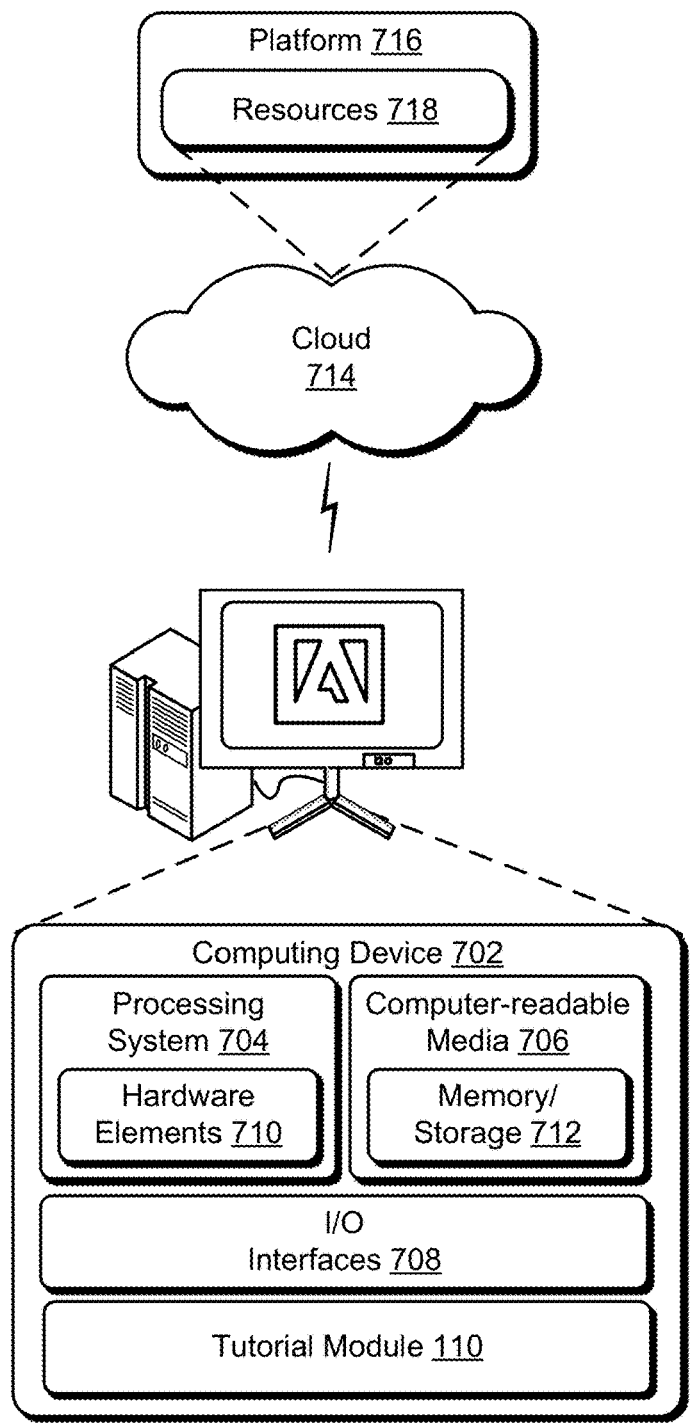
FIG. 7 illustrates an example system that includes an example computing device that is representative of one or more computing systems and/or devices that may implement the various techniques described herein.

FIG. 7 illustrates an example system 700 that includes an example computing device that is representative of one or more computing systems and/or devices that may implement the various techniques described herein. This is illustrated through inclusion of the tutorial module 110. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources 718 and functions to connect the computing device 702 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although implementations of proficiency based tutorial modification have been described in language specific to structural features and/or methods, it is to be understood that the appended claims are not necessarily limited to the specific features or methods described. Rather, the specific features and methods are disclosed as example implementations of proficiency based tutorial modification, and other equivalent features and methods are intended to be within the scope of the appended claims. Further, various different examples are described and it is to be appreciated that each described example can be implemented independently or in connection with one or more other described examples.

What is claimed is:

1. In a digital medium environment to modify a tutorial for editing tools of an application for editing digital images, a method implemented by a computing device, the method comprising:
    determining, by a proficiency module, a difference between a modification of a digital image performed by a user with an editing tool of the application and a modification of the digital image performed by an algorithm of the application;
    generating, by the proficiency module, a proficiency score for the editing tool based on the difference, the proficiency score indicating the user's proficiency in using the editing tool;
    determining, by a comparison module, the proficiency score is greater than a proficiency threshold; and
    generating, by a modification module, a modified tutorial based on the proficiency score being greater than the proficiency threshold.

2. The method as described in claim 1, wherein the modified tutorial does not include a tutorial step of the tutorial that describes use of the editing tool.

3. The method as described in claim 1, wherein the modified tutorial includes a first tutorial step arranged after a second tutorial step and the tutorial includes the first tutorial step arranged before the second tutorial step.

4. The method as described in claim 3, wherein the first tutorial step describes use of the editing tool.

5. The method as described in claim 1, wherein the modified tutorial includes a pre-modified input image depicting a modification applied to an input image of the tutorial using the editing tool.

6. The method as described in claim 1, wherein the editing tools of the application are order independent.

7. The method as described in claim 1, wherein the difference is a distance.

8. One or more non-transitory computer-readable storage media comprising instructions stored thereon that, responsive to execution by a computing device in a digital medium environment to modify a tutorial for editing tools of an application for editing digital content, cause operations of the computing device including:
    computing a proficiency score for an editing tool of the application based on digital content edited by a user using the editing tool of the application, the proficiency score indicating the user's proficiency in using the editing tool;
    determining the proficiency score is greater than a proficiency threshold; and
    generating a modified tutorial by removing a tutorial step from the tutorial that describes use of the editing tool of the application based on the proficiency score being greater than the proficiency threshold.

9. The one or more non-transitory computer-readable storage media as described in claim 8, wherein the editing tools of the application are order independent.

10. The one or more non-transitory computer-readable storage media as described in claim 8, wherein the proficiency score is computed at least partially based on a number of times the user used the editing tool to edit the digital content.

11. The one or more non-transitory computer-readable storage media as described in claim 8, wherein the operations further include generating a pre-modified input image for the modified tutorial by editing an input image for the tutorial using the editing tool.

12. The one or more non-transitory computer-readable storage media as described in claim 8, wherein the proficiency score is computed at least partially based on a difference between a modification of a digital image of the digital content performed by the user with the editing tool of the application and a modification of the digital image performed by an algorithm of the application.

13. The one or more non-transitory computer-readable storage media as described in claim 12, wherein the difference is a distance.

14. In a digital medium environment to modify a tutorial for editing tools of an application for editing digital images, a system comprising:
    means for determining a difference between a modification of a digital image performed by a user with an editing tool of the application and a modification of the digital image performed by an algorithm of the application;

generating, by a computing device of the system, a proficiency score for the editing tool based on the difference, the proficiency score indicating the user's proficiency in using the editing tool;

determining, by the computing device, the proficiency score is greater than a proficiency threshold; and means for generating a modified tutorial based on the proficiency score being greater than the proficiency threshold.

15. The system as described in claim 14, wherein the modified tutorial does not include a tutorial step of the tutorial that describes use of the editing tool.

16. The system as described in claim 14, wherein the modified tutorial includes a first tutorial step arranged after a second tutorial step and the tutorial includes the first tutorial step arranged before the second tutorial step.

17. The system as described in claim 16, wherein the first tutorial step describes use of the editing tool.

18. The system as described in claim 14, wherein the modified tutorial includes a pre-modified input image depicting a modification applied to an input image of the tutorial using the editing tool.

19. The system as described in claim 14, wherein the difference is a distance.

20. The system as described in claim 14, wherein the editing tools of the application are order independent.

* * * * *